US011883931B2

(12) United States Patent
Van Essen et al.

(10) Patent No.: US 11,883,931 B2
(45) Date of Patent: *Jan. 30, 2024

(54) TOOL BIT

(71) Applicant: MILWAUKEE ELECTRIC TOOL CORPORATION, Brookfield, WI (US)

(72) Inventors: James J. Van Essen, Hales Corners, WI (US); Michael J. Zimmermann, New Berlin, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,856

(22) Filed: Aug. 12, 2022

(65) Prior Publication Data

US 2022/0379442 A1 Dec. 1, 2022

Related U.S. Application Data

(63) Continuation of application No. 16/542,509, filed on Aug. 16, 2019, now Pat. No. 11,413,729.
(Continued)

(51) Int. Cl.
*B25B 15/00* (2006.01)
*B23K 26/356* (2014.01)
(Continued)

(52) U.S. Cl.
CPC .......... *B25B 15/002* (2013.01); *B23K 26/356* (2015.10); *B24C 1/10* (2013.01);
(Continued)

(58) Field of Classification Search
CPC ... B25B 15/002; B25B 15/005; B25B 15/007; B25B 15/008; B25B 23/0035; B25B 21/00; B23K 26/356; B24C 1/10
See application file for complete search history.

(56) References Cited

U.S. PATENT DOCUMENTS 1,353,761 A 9/1920 Knoche
3,133,568 A 5/1964 Reed
(Continued)

FOREIGN PATENT DOCUMENTS

DE 4300446 A1 6/1994
EP 2527066 A2 11/2012
(Continued)

OTHER PUBLICATIONS

European Patent Office Extended Search Report for Application No. 19192364.8 dated Jan. 30, 2020 (7 pages).
(Continued)

*Primary Examiner* — David B. Thomas
(74) *Attorney, Agent, or Firm* — Michael Best & Friedrich LLP

(57) ABSTRACT

A tool bit includes a drive portion configured to be engaged by a tool, the drive portion including a first maximum outer dimension, a shank extending from the drive portion and including a reduced outer diameter, and a tip coupled to an end of the shank opposite from the drive portion. The tip includes a compressive residual stress layer formed by blasting to increase a wear resistance of the tip relative to the shank. The tip additionally includes a second maximum outer dimension. The reduced outer diameter of the shank is smaller than the first maximum outer dimension of the drive portion and the second maximum outer dimension of the tip.

20 Claims, 7 Drawing Sheets

Related U.S. Application Data

(60) Provisional application No. 62/820,354, filed on Mar. 19, 2019, provisional application No. 62/719,852, filed on Aug. 20, 2018.

(51) Int. Cl.
  *B24C 1/10* (2006.01)
  *B25B 23/00* (2006.01)
  *B25B 21/00* (2006.01)

(52) U.S. Cl.
  CPC ........ *B25B 15/005* (2013.01); *B25B 23/0035* (2013.01); *B25B 15/007* (2013.01); *B25B 15/008* (2013.01); *B25B 21/00* (2013.01)

(56) References Cited

U.S. PATENT DOCUMENTS

| | | | |
|---|---|---|---|
| 3,176,932 A | 4/1965 | Kovaleski | |
| 3,903,761 A | 9/1975 | Runton | |
| D244,808 S | 6/1977 | Ubermuth | |
| 4,269,246 A | 5/1981 | Arson et al. | |
| 5,024,759 A | 6/1991 | McGrath et al. | |
| D330,318 S | 10/1992 | Snider | |
| 5,515,754 A | 5/1996 | Elkins | |
| 5,724,873 A | 3/1998 | Dillinger | |
| 5,868,047 A | 2/1999 | Faust et al. | |
| D428,106 S | 7/2000 | Yamaguchi | |
| 6,154,108 A | 11/2000 | Huang | |
| 6,209,426 B1 | 4/2001 | Takahashi | |
| 6,249,199 B1 | 6/2001 | Liu | |
| 6,289,541 B1 | 9/2001 | Anderson et al. | |
| 6,311,989 B1 | 11/2001 | Rosanwo | |
| D457,046 S | 5/2002 | Boyle et al. | |
| D457,797 S | 5/2002 | Huang | |
| 6,410,884 B1 * | 6/2002 | Hackel ................ | B21D 26/00 219/121.61 |
| 6,530,299 B1 | 3/2003 | Liu | |
| 6,722,667 B2 | 4/2004 | Cantlon | |
| 6,761,361 B2 | 7/2004 | Taylor et al. | |
| D497,300 S | 10/2004 | Chen | |
| 6,877,402 B1 | 4/2005 | Pigford et al. | |
| 6,883,405 B2 | 4/2005 | Strauch | |
| 6,931,967 B1 | 8/2005 | Chang | |
| 7,097,398 B2 | 8/2006 | Hernandez, Jr. | |
| 7,107,882 B1 | 9/2006 | Chang | |
| 7,159,493 B1 | 1/2007 | Huang | |
| 7,225,710 B2 | 6/2007 | Pacheco, Jr. | |
| 7,261,023 B2 | 8/2007 | Taguchi | |
| 7,469,909 B2 | 12/2008 | Strauch et al. | |
| 7,574,946 B1 | 8/2009 | Chang | |
| D615,380 S | 5/2010 | Su | |
| D623,036 S | 9/2010 | DeBaker | |
| D631,723 S | 2/2011 | DeBaker | |
| 7,922,180 B2 | 4/2011 | Meng | |
| D644,903 S | 9/2011 | Chen | |
| D646,138 S | 10/2011 | Hsu | |
| D648,607 S | 11/2011 | Tanger | |
| D655,369 S | 3/2012 | Hafner | |
| 8,132,990 B2 | 3/2012 | Bauman | |
| 8,176,817 B2 | 5/2012 | Liu | |
| 8,291,795 B2 | 10/2012 | Hughes et al. | |
| 8,366,356 B2 | 2/2013 | Novak et al. | |
| 8,616,097 B2 | 12/2013 | Hughes et al. | |
| 8,864,143 B2 | 10/2014 | Lin | |
| D725,984 S | 4/2015 | Moss et al. | |
| D726,521 S | 4/2015 | Moss et al. | |
| 9,132,534 B2 | 9/2015 | Lai | |
| D752,408 S | 3/2016 | Moss et al. | |
| 9,314,909 B2 | 4/2016 | Vaamonde Coton et al. | |
| D759,459 S | 6/2016 | Thomson | |
| D764,251 S | 8/2016 | Hsu | |
| 9,406,423 B1 | 8/2016 | Tsai | |
| 9,505,108 B2 | 11/2016 | Peters | |
| D789,761 S | 6/2017 | Moss et al. | |
| 10,150,205 B2 | 12/2018 | Santamarina et al. | |
| D838,566 S | 1/2019 | Moss et al. | |
| D841,425 S | 2/2019 | Moss et al. | |
| 11,052,487 B2 * | 7/2021 | Hegenbart ........... | B23K 26/356 |
| 11,052,488 B2 * | 7/2021 | Yano ..................... | B23K 26/53 |
| 11,413,729 B2 * | 8/2022 | Van Essen ................ | B24C 1/10 |
| 11,440,099 B2 * | 9/2022 | Wu ...................... | B23K 26/082 |
| 11,590,609 B2 * | 2/2023 | Cheng .................. | B23K 26/356 |
| 2004/0093997 A1 | 5/2004 | Huang | |
| 2005/0098002 A1 | 5/2005 | Holland-Letz | |
| 2005/0166725 A1 | 8/2005 | Chen | |
| 2006/0278050 A1 | 12/2006 | Hsiao | |
| 2007/0234856 A1 | 10/2007 | Liu | |
| 2009/0139378 A1 | 6/2009 | Chiang et al. | |
| 2009/0174157 A1 | 7/2009 | Chang | |
| 2009/0288525 A1 | 11/2009 | Chen | |
| 2010/0011918 A1 | 1/2010 | Ray | |
| 2010/0219594 A1 | 9/2010 | Nash | |
| 2010/0307298 A1 | 12/2010 | Lai | |
| 2011/0197721 A1 | 8/2011 | Debaker | |
| 2012/0160064 A1 | 6/2012 | Moss et al. | |
| 2013/0180969 A1 * | 7/2013 | Cheng .................. | B23K 26/356 219/121.85 |
| 2015/0202751 A1 | 7/2015 | Chen | |
| 2016/0016298 A1 | 1/2016 | Zhang | |
| 2016/0023333 A1 | 1/2016 | Chen | |
| 2016/0237521 A1 * | 8/2016 | Zhang ..................... | C21D 7/06 |
| 2016/0271768 A1 | 9/2016 | Zhang | |
| 2016/0279769 A1 | 9/2016 | Arslan | |
| 2016/0325411 A1 | 11/2016 | Wang | |
| 2017/0120428 A1 | 5/2017 | Wang | |
| 2018/0354102 A1 | 12/2018 | Kukucka et al. | |
| 2019/0118302 A1 * | 4/2019 | Hegenbart ........... | C21D 10/005 |
| 2019/0291246 A1 | 9/2019 | Wang | |
| 2019/0358747 A1 * | 11/2019 | Yano .................. | B23K 26/0643 |
| 2020/0055145 A1 * | 2/2020 | Muto .................. | B23K 26/0648 |

FOREIGN PATENT DOCUMENTS

| | | |
|---|---|---|
| GB | 950544 A | 2/1964 |
| WO | 2005042210 A1 | 5/2005 |
| WO | 2006111447 A1 | 10/2006 |
| WO | 2008043514 A1 | 4/2008 |
| WO | 2010054169 A1 | 5/2010 |
| WO | 2012110453 A1 | 8/2012 |
| WO | 2017055657 A1 | 4/2017 |
| WO | 2018098700 A1 | 6/2018 |

OTHER PUBLICATIONS

European Patent Office Action for Application No. 19192364.8 dated Feb. 8, 2022 (5 pages).

* cited by examiner

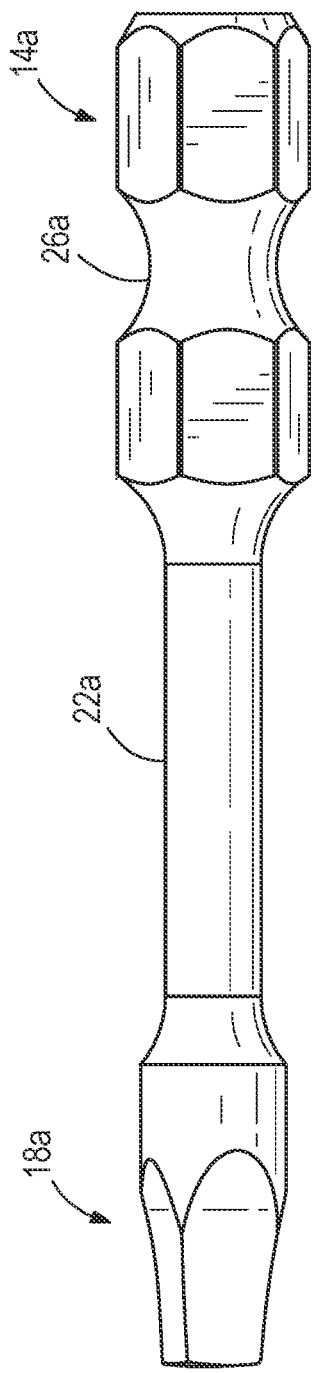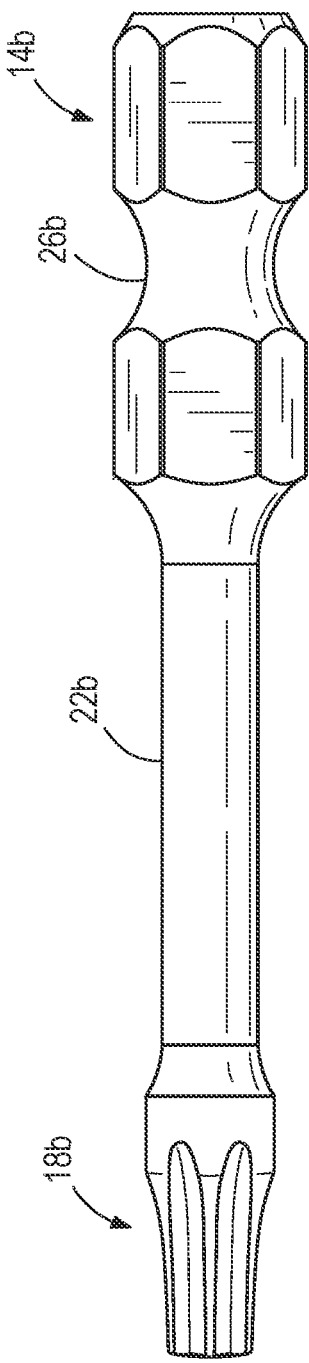

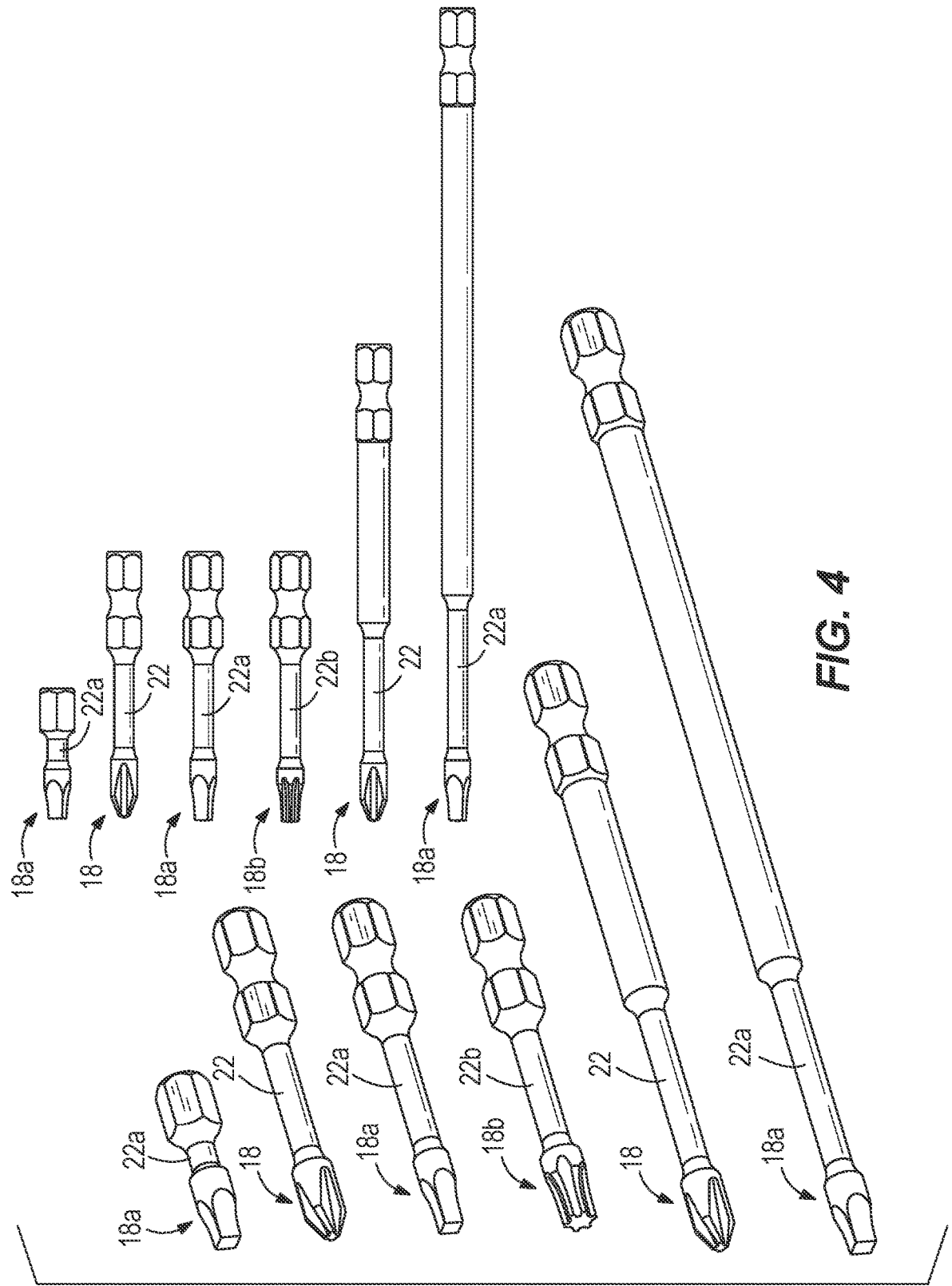

TOOL BIT

CROSS-REFERENCE TO RELATED APPLICATIONS

This application is a continuation of U.S. patent application Ser. No. 16/542,509, filed on Aug. 16, 2019, now U.S. Pat. No. 11,413,729, which claims priority to U.S. Provisional Patent Application No. 62/820,354, filed on Mar. 19, 2019, and to U.S. Provisional Patent Application No. 62/719,852, filed on Aug. 20, 2018, the entire contents of all of which are incorporated by reference herein.

FIELD OF THE INVENTION

The present invention relates to tool bits, and more particularly to tool bits configured for interchangeable use with a driver.

SUMMARY

In one aspect, the invention provides a tool bit including a drive portion configured to be engaged by a tool, the drive portion including a first maximum outer dimension, a shank extending from the drive portion and including a reduced outer diameter, and a tip coupled to an end of the shank opposite from the drive portion, the tip having a compressive residual stress layer formed by blasting to increase a wear resistance of the tip relative to the shank, the tip including a second maximum outer dimension, wherein the reduced outer diameter of the shank is smaller than the first maximum outer dimension of the drive portion and the second maximum outer dimension of the tip.

In another aspect, the invention provides a method of manufacturing a tool bit, the method including providing a piece of stock metal, forming a drive portion in the piece of stock metal, the drive portion configured to be engaged by a tool and having a first maximum outer dimension, forming a tip in the piece of stock metal, the tip having a second maximum outer dimension, forming a shank in the piece of stock metal between the tip and the drive portion, the shank having a reduced outer diameter that is smaller than the first maximum outer dimension and the second maximum outer dimension, and blasting the tip to form a compressive residual stress layer that increases a wear resistance of the tip relative to the shank.

In another aspect, the invention provides a tool bit including a drive portion configured to be engaged by a tool, a shank extending from the drive portion, and a tip coupled to an end of the shank opposite from the drive portion, the tip having a compressive residual stress layer formed by blasting to increase a wear resistance of the tip relative to the shank, the tip including a plurality of vanes circumferentially spaced around the tip, and a plurality of flutes disposed between the plurality of vanes, the plurality of flutes extending longitudinally along the tip and converging into the plurality of vanes, each flute being defined by a single, curved surface.

Other aspects of the invention will become apparent by consideration of the detailed description and accompanying drawings.

BRIEF DESCRIPTION OF THE DRAWINGS

FIG. 3a is a side view of another tool bit in accordance with an embodiment of the invention.

FIG. 3b is a side view of another tool bit in accordance with an embodiment of the invention.

FIG. 4 illustrates alternative tool bits, including various tips configurations and shanks of various lengths.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
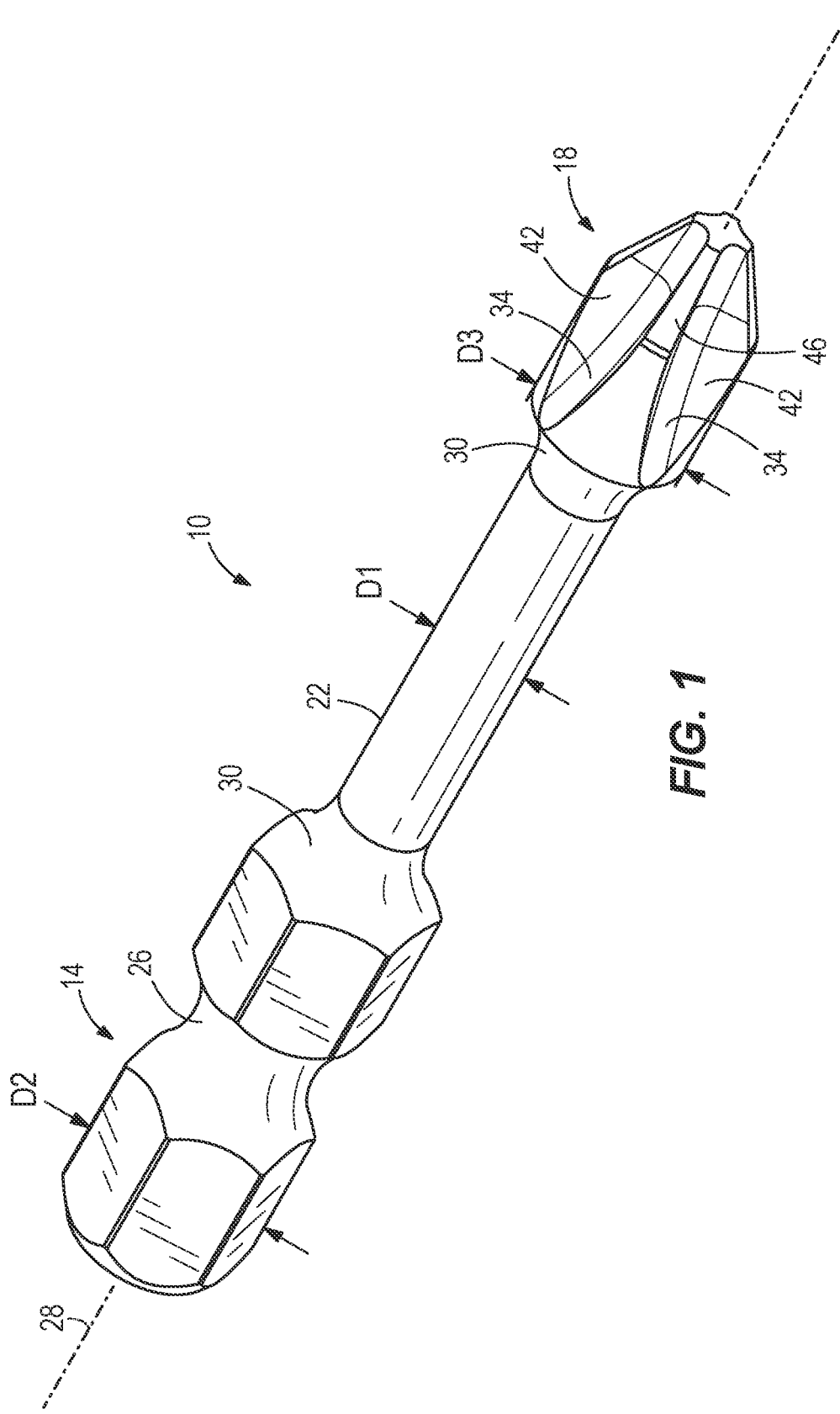
FIG. 1 is a perspective view of a tool bit in accordance with an embodiment of the invention.
Figure 2:
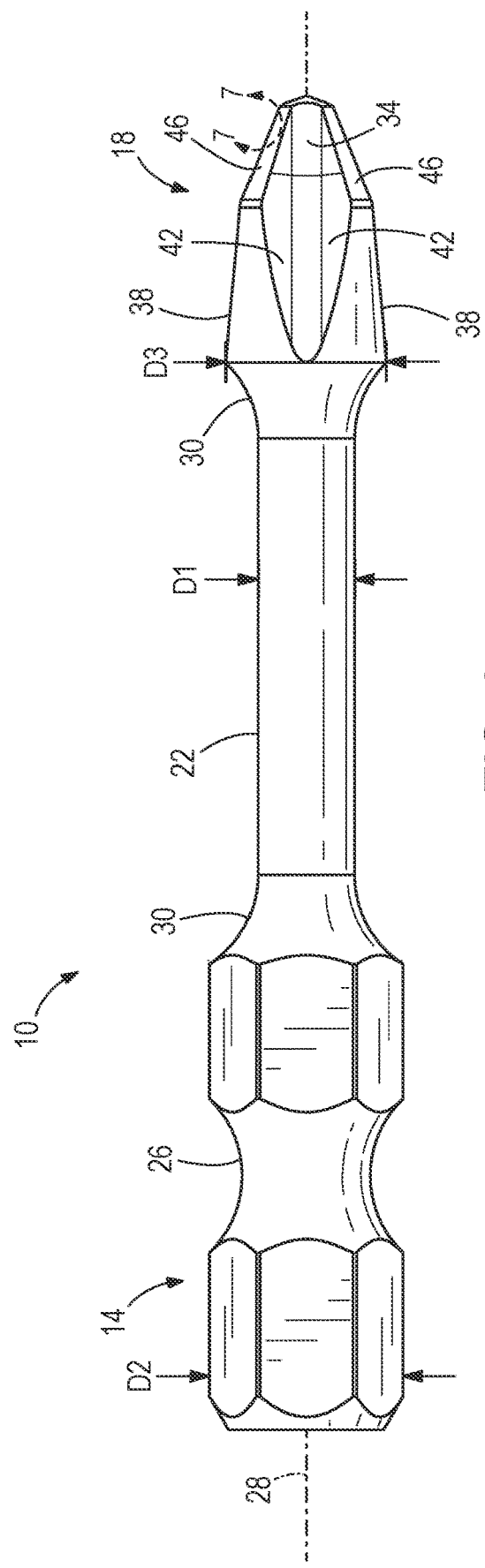
FIG. 2 is a side view of the tool bit of FIG. 1.

FIGS. 1-2 illustrate a tool bit 10 including a drive portion 14, a tip 18, and a shank 22 interconnecting the drive portion 14 and the tip 18. The tool bit 10 also includes a central longitudinal axis 28 extending through the drive portion 14, the shank 22, and the tip 18. The central longitudinal axis 28 defines a rotational axis of the tool bit 10.

The drive portion 14 is configured to be engaged by any number of different tools, adapters, or components to receive torque from the tool, adapter, or component to rotate the bit 10. For example, the bit 10 may be utilized with a driver including a socket having a corresponding recess in which the drive portion 14 of the bit 10 is received. The driver may also include a stem extending from the socket, which may be coupled to a handle for hand-use by an operator or to a chuck of a power tool (e.g., a drill) for powered use by the operator. A sliding, frictional fit between the drive portion 14 of the bit 10 and the socket may be used to axially secure the bit 10 to the driver. Alternatively, a quick-release structure may be employed to axially secure the bit 10 to the driver. The illustrated drive portion 14 is a hexagonal drive portion having a hexagonal cross-section. In other embodiments, the drive portion 14 may have other suitable shapes. As shown in FIGS. 1-2, the drive portion 14 of the bit 10 includes a groove 26 into which the quick-release structure (e.g., a ball detent) may be positioned to axially secure the bit 10 to the driver. Alternatively, the groove 26 may be omitted from the drive portion 14 of the bit 10 should, for example, a sliding frictional fit between the socket and the drive portion 14 be employed.

With continued reference to FIGS. 1-2, the tip 18 is coupled to an end of the shank 22 opposite from the drive portion 14. In the illustrated embodiment, the tip 18 is integrally formed with the shank 22, but may alternatively be a separate piece that is permanently secured to the shank 22. The tip 18 provides a working end or head for the bit 10 and is configured to engage a fastener (e.g., a screw). In the illustrated embodiment, the tip 18 is configured as a Philips-style tip. Alternatively, as shown in FIGS. 3-4, the tip 18 may have other configurations to engage different styles of fasteners. For example, the tip 18 may be configured as a straight blade (otherwise known as a "regular head") to engage fasteners having a corresponding straight slot. Other tip configurations (e.g., hexagonal, star, square, etc.) may also be employed with the bit 10. For example, FIGS. 3a and 4 displays a tip 18a with a square configuration, and FIGS.

3b and 4 displays a tip 18b with a torx configuration. FIGS. 3a, 3b, and 4 illustrate alternative bits 10a, 10b. The bits 10a, 10b are similar to the bit 10 described above and include like parts. Components that are similar to those described in the bit 10 have the same reference number plus "a" or "b."

The shank 22 extends between the drive portion 14 and the tip 18. In the illustrated embodiment, the shank 22 has a reduced diameter, or dimension, D1 compared to the remainder of the bit 10. More particularly, the reduced diameter D1 is an outer diameter of the shank 22, which is smaller than a maximum outer diameter, or dimension, D2 of the drive portion 14 and a maximum outer diameter, or dimension, D3 of the tip 18. The reduced diameter D1 of the shank 22 removes localized regions of high stress and discontinuities, thereby increasing the durability of the shank 22 to extend the operational lifetime of the tool bit 10. The shank 22 further includes a fillet 30 at either end, transitioning to the larger diameter drive portion 14 and tip 18. The fillets 30 are contiguous with the drive portion 14 and the tip 18. In addition, each fillet 30 has a generally constant radius of curvature between the shank 22 and the drive portion 14 or the tip 18. As illustrated in FIG. 4, the shank 22 may be various lengths. For example, the shank 22 may be at least 10% of the total length of the tool bit 10, measured in a direction along the longitudinal axis 28. In other embodiments, the shank may be at least 30% of the total length of the tool bit 10. In further embodiments, the shank 22 may be at least 50% of the total length of the tool bit 10. In some embodiments where the drive portion 14 is relatively short, as also illustrated in FIG. 4, the groove 26 of the drive portion 14 may be defined by the fillet 30 transitioning from the shank 22 to the drive portion 14.

Figure 5:
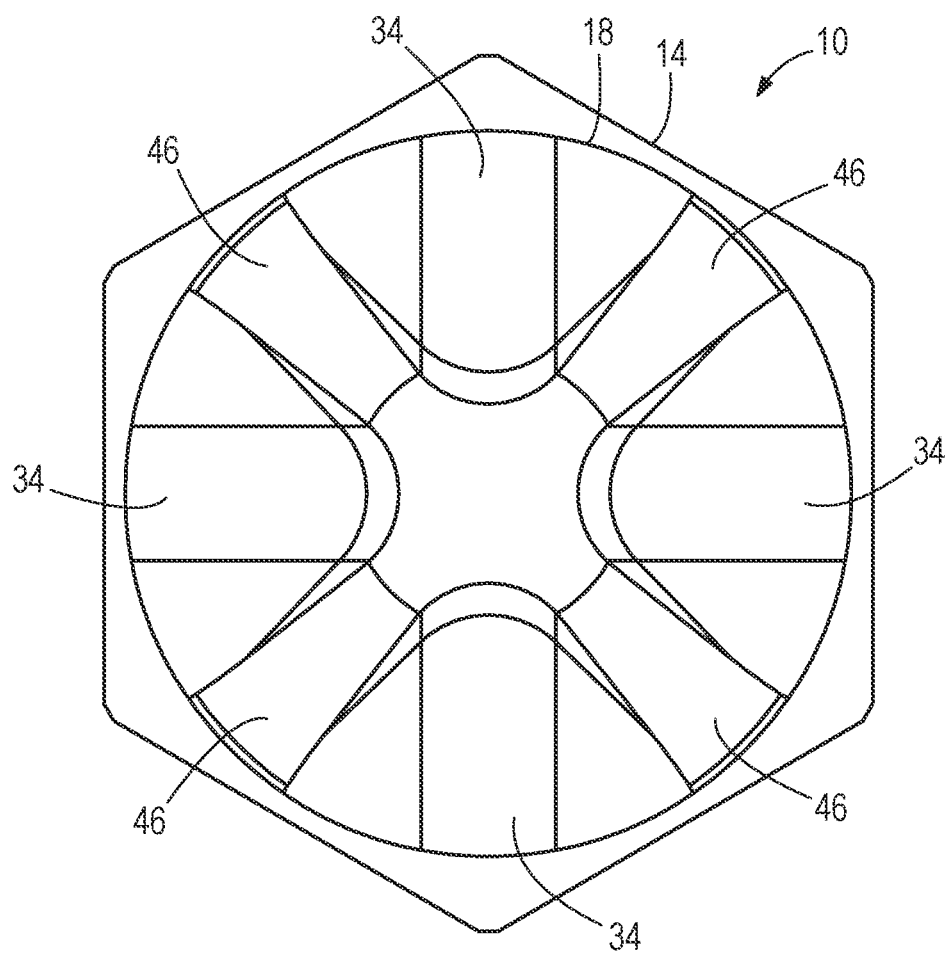
FIG. 5 is an enlarged end view of the tool bit of FIG. 1.

As shown in FIGS. 1, 2 and 5, the tip 18 includes a plurality of flutes 34, or recesses, circumferentially spaced around the tip 18. The illustrated flutes 34 are equidistantly disposed about the axis 28. The flutes 34 extend longitudinally along the tip 18 and converge into vanes 38. The vanes 38 are formed with flat, tapered side walls 42 and outer walls 46, such that the outer walls 46 are inclined and form the front ends of the vanes 38. The vanes 38 are also equidistantly disposed around the tip 18. In the illustrated embodiment, the vanes 38 gradually increase in thickness towards the shank 22, which increases the strength of the bit 10.

The illustrated flutes 34 are defined by a single, curved surface having a radius of curvature. In some embodiments, the radius of curvature may be between 0.6 mm and 1.0 mm. In the illustrated embodiment, the radius of curvature is approximately 0.8 mm. The radius of curvature is continuous between adjacent vanes 38. Providing curved flutes helps reduce stress concentrations within the flutes 34. By reducing stress concentrations, the curved flutes 34 increase the life of the tool bit 10 when the bit 10 is subjected to repeated alternating loads (e.g., the type of loading applied by an impact driver during use).

Figure 6:
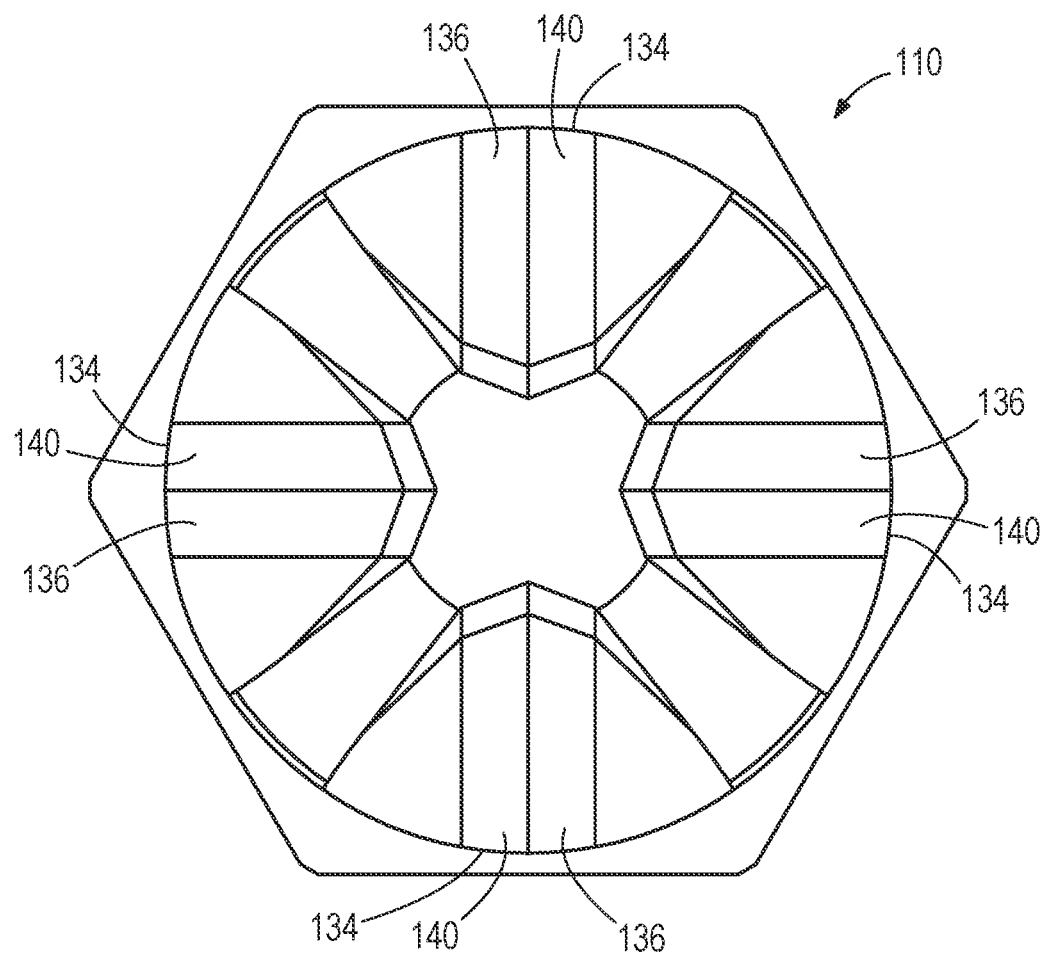
FIG. 6 is an enlarged end view of a prior art tool bit.

In contrast, FIG. 6 displays a conventional tool bit 110 with a Philips-style tip 118. The tool bit 110 includes flutes 134, each having a first flat section 136 and a second flat section 140 oriented approximately 140 degrees relative to each other. This orientation of the first flat section 136 relative to the second flat section 140 may lead to stress concentrations within the flute 134.

Figure 7:
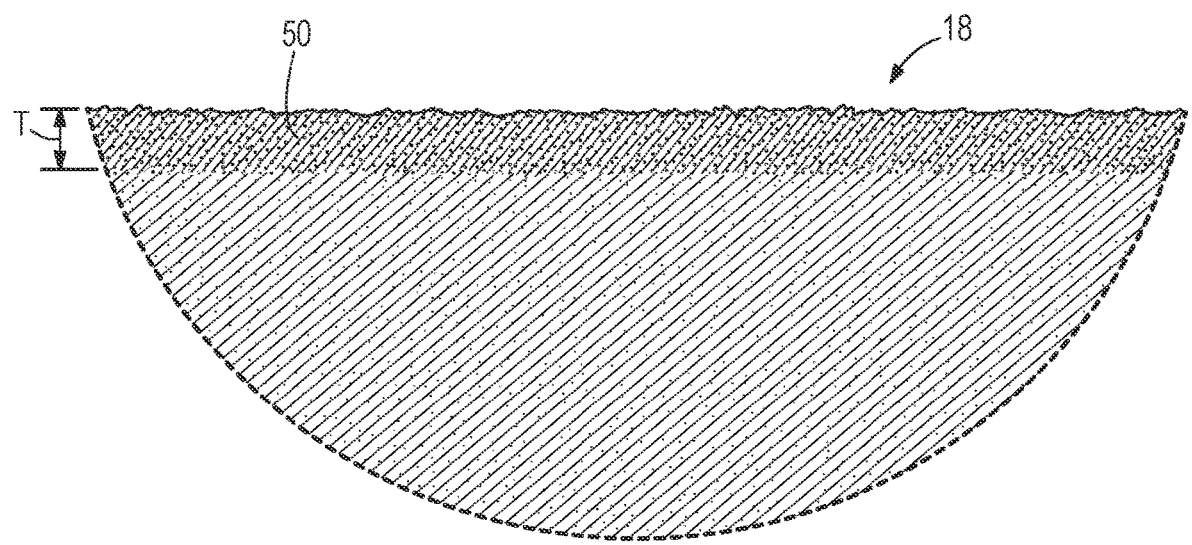
FIG. 7 is an enlarged perspective view of a tip of the tool bit of FIG. 1.

The tool bit 10 is manufactured from bar stock. The shank 22 is machined to a particular length to facilitate elastic deformation of the shank 22 when the tool bit 10 is utilized with an impact drive. Additionally, the tip 18 is blasted, thereby increasing the hardness of the tip 18. In the embodiments described below, only the tip 18 is blasted. The remainder of the tool bit 10 (specifically the shank 22) remains un-blasted to maintain a relatively lower hardness. In some embodiments, the tip 18 of the tool bit 10 is blasted via a shot-peening process. With reference to FIG. 7, the shot-peening process produces a compressive residual stress layer 50 and modifies mechanical properties of metal at the tip 18. This increases the wear resistance of the tip 18, while allowing the shank 22 to remain ductile. Specifically, the shot peening process involves impacting the bar stock with a small, spherical shot of particles (e.g., metallic, glass, ceramic). The shot acts as a peen hammer and dimples the surface of the bar stock, causing compression stresses under the dimple. As the bar stock undergoes more shots, the stock forms multiple overlapping dimples throughout the metal surface being treated. The surface compression stress strengthens the metal, ensuring that the finished part will resist fatigue failures, corrosion fatigue and cracking, and galling and erosion from cavitation.

In operation of the tool bit 10, the reduced diameter of the shank 22 is configured to increase the impact resistance or the toughness of the tool bit 10, such that the tip 18 of the tool bit 10 is allowed to elastically deform or twist relative to the drive portion 14 about the central axis 28 of the tool bit 10. Additionally, the shot-peening process increases the wear resistance of the tip 18 relative to the remainder of the bit 10. As such, the curved flutes 34 in combination with the shot-peened tip 18 relieve various stress concentrations within the tip 18 and prolong the life of the tool bit 10.

In the illustrated embodiment of FIG. 1, different manufacturing processes can be used to impart a greater hardness to the tip 18 compared to the hardness of the shank 22. For example, the entire bit 10 can be treated to an initial, relatively low hardness level and then the tip 18 may undergo shot peening. Additionally, the shank 22 may undergo a separate manufacturing process in order to create the reduced diameter portion. In alternative embodiments, the entire bit 10 can be heat treated to an initial, relatively low hardness level and then a secondary heat treating process can be applied only to the tip 18 to increase the hardness of the tip 18 to a relatively high hardness level to reduce the wear imparted to the tip 18 during use of the bit 10. Alternatively, in a different manufacturing process, the entire bit 10 can be heat treated to an initial, relatively high hardness level and then a secondary annealing process can be applied to the shank 22 (and, optionally, the drive portion 14) to reduce the hardness of the shank 22 (and optionally the drive portion 14) to a relatively low hardness level to increase the torsional resiliency of the shank 22, and therefore its impact resistance, during use of the bit 10.

In some embodiments, the tip 18 of the driver bit 10 may be blasted via a laser blasting manufacturing process, rather than the shot-peening process. Specifically, a high-energy pulsed laser beam generates shock waves which impact the tip 18 and produces the compressive residual stress layer 50 (e.g., a laser effect layer). In some embodiments, the laser beams impact approximately 2-5 μm of the surface of the tip 18. In such embodiments, the compressive residual stress layer 50 (FIG. 7) is 2-5 μm. The shock waves reduce cold working in the microstructure, improving the durability and performance of the material. The laser blasting process provides various benefits to the manufacturing process. Specifically, the laser blasting process is a low complexity operation and provides a low risk of jamming during the process, therefore maximizing the machining time. The laser blasting process additionally provides a faster cycle time, cleaner operation with minimal airborne particulate, and higher cosmetic consistency than sandblasting and/or shot-peening.

In some embodiments, the tip 18 of the driver bit 10 may be blasted via a laser ablation manufacturing process. Specifically, a laser may be focused onto the bit 10, thereby removing material from an irradiated zone. The irradiated zone absorbs the laser beam and breaks down chemical bonds on the bit surface, thereby forming the compressive stress layer 50 (FIG. 7) (e.g., a laser effect layer). Depending on the level of laser flux applied to the bit 10, the material in the irradiated zone may be absorbed by the laser's energy and transitioned into a gaseous state, or may be converted to plasma. Specifically, the laser may include a maximum power of approximately 60 Watts and emit a frequency of approximately 60,000-100,000 Hz. The laser ablating process provides various benefits to the manufacturing process. Specifically, the laser ablation process produces a finer surface finish compared to alternative manufacturing processes, thereby reducing corrosion. The laser ablation process additionally provides a faster operation time and more cost-effective process than alternative manufacturing methods.

The tip blasting processes (e.g., shot peening, laser blasting, laser ablation, etc.) described above strip away a protective coating present on the bit 10 in order to locally harden the surface of the bit 10. Therefore, in some embodiments, the bit 10 may additionally include an outer, rust preventative coating applied to the surface following the manufacturing process.

Figure 8:
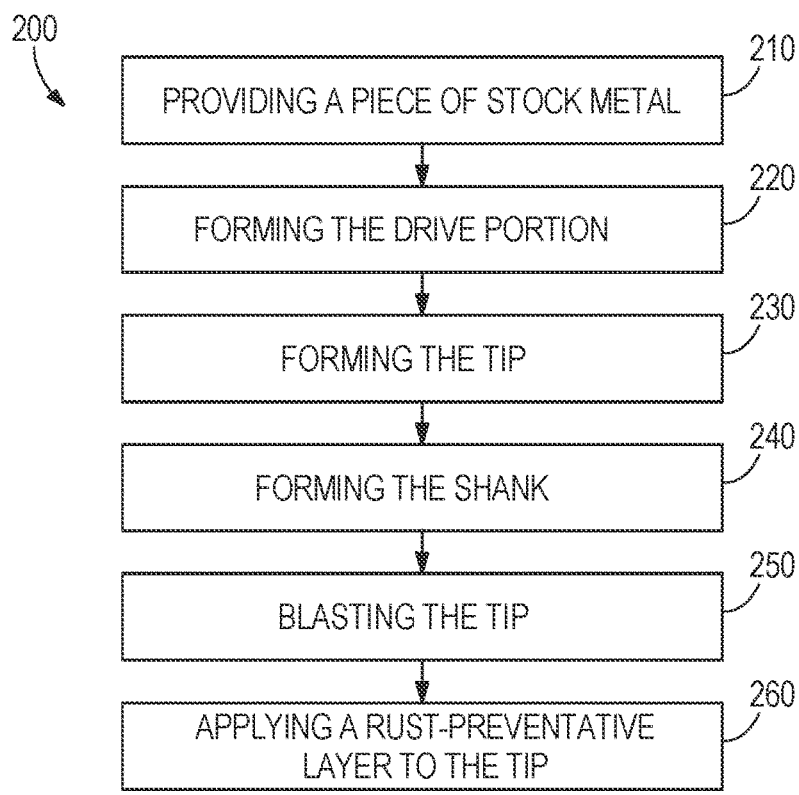
FIG. 8 is a flow chart illustrating a process of manufacturing the tool bit of FIG. 1.

FIG. 8 illustrates a process 200 of manufacturing the bit 10. The process 200 begins at step 210 where a piece of stock metal is provided. At step 220, the drive portion 14 is formed in the piece of stock metal. The drive portion 14 is specifically formed to include the maximum outer diameter D2. At step 230, the tip 18 is formed in the piece of stock metal. The tip 18 is formed to include the maximum outer diameter D3. As described above, the drive portion 14 and the tip 18 may be formed from a variety of manufacturing methods, such as machining, molding, and the like. In some embodiments, the drive portion 14 and the tip 18 may be formed from different manufacturing methods. At step 240, the shank 22 is formed from the piece of stock metal. Specifically, the shank 22 is formed to include the reduced outer diameter D1, which is smaller than the maximum outer diameters D2, D3 of the drive portion 14 and the tip 18. The shank 22 is additionally machined to a specific length, in order to aid in elastic deformation. The shank 22 may be formed from a variety of manufacturing processes, such as rotary cutting or machining. In some embodiments, the shank 22 may be formed from a different manufacturing process than the drive portion 14 and/or tip 18. Additionally, the drive portion 14, the tip 18, and the shank 22 may optionally undergo a heat treatment process before and/or after being formed.

At step 250, the tip 18 is blasted to form the compressive residual stress layer 50 to increase the wear resistance of the bit 10. As described above, the tip 18 may be blasted via the shot-peening process, the laser blasting process, or the laser ablation process in order to strip away a pre-existing coating on the tip 18. At step 260, a rust preventative coating is applied to the tip 18 in order to prevent the formation of rust and/or protect the tip 18. More specifically, the rust preventative coating is applied to the compressive residual stress layer 50 of the tip 18.

In some embodiments, the manufacturing process 200 may not include all of the steps described above or may include additional steps. In addition, the steps may be performed in other orders (e.g., the tip 18 may be blasted before the shank 22 is formed).

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A tool bit comprising:
a drive portion configured to be engaged by a tool;
a shank extending from the drive portion;
a tip coupled to an end of the shank opposite from the drive portion, the tip having a compressive residual stress layer formed by blasting to increase a wear resistance of the tip relative to the shank; and
a rust preventative coating applied to the compressive residual stress layer of the tip.

2. The tool bit of claim 1, wherein the compressive residual stress layer has a thickness of 2 μm to 5 μm.

3. The tool bit of claim 1, wherein the tip has a greater hardness than the shank.

4. The tool bit of claim 3, wherein the shank increases an impact resistance of the tool bit such that the tip is allowed to twist relative to the drive portion.

5. The tool bit of claim 1, wherein the tip includes a plurality of flutes circumferentially spaced around the tip, wherein the plurality of flutes converge into a plurality of vanes, and wherein each flute is defined by a single, curved surface.

6. The tool bit of claim 1, wherein the tip is laser blasted by impacting the tip with a high-energy pulsed laser beam.

7. The tool bit of claim 1, wherein the tip is laser ablated by focusing a laser onto the tip to remove material from an irradiated zone and break down chemical bonds on a surface of the tip.

8. The tool bit of claim 1, wherein the shank includes a first fillet that transitions to the drive portion and a second fillet that transitions to the tip.

9. The tool bit of claim 1, wherein the drive portion has a hexagonal cross-section.

10. The tool bit of claim 9, wherein the drive portion includes a groove configured to secure the drive portion to the tool.

11. A method of manufacturing a tool bit, the method comprising:
providing a piece of stock metal;
forming a drive portion in the piece of stock metal, the drive portion configured to be engaged by a tool;
forming a tip in the piece of stock metal;
forming a shank in the piece of stock metal between the tip and the drive portion; and
blasting the tip to form a compressive residual stress layer that increases a wear resistance of the tip relative to the shank;
wherein blasting the tip includes
laser blasting the tip by impacting the tip with a high-energy pulsed laser beam, or
laser ablating the tip by focusing a laser onto the tip to remove material from an irradiated zone and break down chemical bonds on a surface of the tip.

12. The method of claim 11, further comprising applying a rust preventative coating to the tip.

13. The method of claim 11, further comprising heat treating at least one of the drive portion, the tip, and the shank.

14. The method of claim 11, wherein the tip includes a maximum outer dimension greater than a diameter of the shank.

15. The method of claim 11, wherein the drive portion includes a maximum outer dimension greater than a diameter of the shank.

16. A tool bit comprising:
   a drive portion configured to be engaged by a tool;
   a shank extending from the drive portion; and
   a tip coupled to an end of the shank opposite from the drive portion, the tip having a compressive residual stress layer formed by laser blasting the tip with a high-energy pulsed laser beam to increase a wear resistance of the tip relative to the shank.

17. The tool bit of claim 16, wherein the compressive residual stress layer has a thickness of 2 μm to 5 μm.

18. The tool bit of claim 16, wherein the tip has a greater hardness than the shank, and wherein the shank increases an impact resistance of the tool bit such that the tip is allowed to twist relative to the drive portion.

19. The tool bit of claim 16, further comprising a rust preventative coating applied to the compressive residual stress layer of the tip.

20. The tool bit of claim 16, wherein the shank includes a first fillet that transitions to the drive portion and a second fillet that transitions to the tip.

* * * * *